United States Patent [19]

McDougall et al.

[11] Patent Number: 4,670,166

[45] Date of Patent: Jun. 2, 1987

[54] POLYMER ARTICLE AND ITS USE FOR CONTROLLED INTRODUCTION OF REAGENT INTO A FLUID

[75] Inventors: Lee A. McDougall, Houston; John C. Newlove, Kingwood; John A. Haslegrave, Houston, all of Tex.

[73] Assignee: Exxon Chemical Patents Inc., Linden, N.J.

[21] Appl. No.: 707,003

[22] Filed: Feb. 27, 1985

[51] Int. Cl.[4] .................. E21B 43/25; E21B 41/02; E21B 43/26
[52] U.S. Cl. .................. 252/8.552; 252/8.551; 252/8.554; 252/8.555
[58] Field of Search .................. 252/8.55 R, 8.55 B, 252/8.55 D, 8.55 E

[56] References Cited

U.S. PATENT DOCUMENTS

| | | | |
|---|---|---|---|
| 3,531,409 | 9/1970 | Seffens et al. | 252/8.55 |
| 3,613,788 | 10/1971 | Kautsky | 252/8.55 X |
| 3,827,977 | 8/1974 | Miles et al. | 252/8.55 |
| 4,046,197 | 9/1977 | Gruesbeck et al. | 252/8.5 X |
| 4,182,417 | 1/1980 | McDonald et al. | 252/8.55 |

*Primary Examiner*—Herbert B. Guynn
*Attorney, Agent, or Firm*—R. A. Dexter; R. L. Graham

[57] ABSTRACT

A solid polymeric body comprising a polymer matrix containing a water-soluble reagent leachable into a fluid containing condensed water, said matrix being reagent permeative and insoluble in said fluid containing condensed water and the said body preferably having a softening point substantially above that of the temperature of the fluid environment in which it is to be employed is useful for the introduction of an additive reagent into said fluid particularly when said fluid is located in a subterranean formation.

13 Claims, No Drawings

POLYMER ARTICLE AND ITS USE FOR CONTROLLED INTRODUCTION OF REAGENT INTO A FLUID

FIELD OF THE INVENTION

This invention relates to a polymeric body useful for introduction of an additive into a fluid. More particularly, this invention relates to a bead containing a water-soluble additive which is leachable into a fluid containing condensed water, its method of making and the method of utilizing the bead to introduce the additive in useful amounts into the fluid.

BACKGROUND TO INVENTION

The recovery of oil and gas from underground geological formations is of great importance in modern society, which uses vast amounts of fossil fuels for its essential energy. The individual well productivity declines over a period of time because of a number of factors, including changes in reservoir fluid characteristics, depletion of reservoir fluid characteristics, depletion of reservoir energy, decreasing permeability of the formation to the oil, the gradual dissipation of the expanding pressure transient, contamination of the well bore, reduced permeability of the oil through the region immediately surrounding the well bore and reduction of the internal diameter of the well pipe.

The response to the declining productivity was the development of numerous techniques, which has become collectively known as well workover and stimulation. The concept of fracturing or formation breakdown has been recognized to play a very important role in the application of these oil production enhancement techniques, including stimulation, acidizing, water injection and cementing of the formation.

Hydraulic fracturing has found wide usage as a well stimulation procedure for creating deep-penetrating fractures (both horizontal and vertical) that provide high capacity channels for flow from deep within the producing formation to the well as for overcoming damaged matrix permeability surrounding a wellbore. In order to produce gas or liquids from a well at a higher rate following a hydraulic fracturing treatment, the reservoir must contain enough fluids in place and the formation must not have regions of severe permeability reduction, particularly in regions adjacent to the well. Early experimental work in shallow wells demonstrated that a hydraulically formed fracture tends to heal—that is, to lose its fluid carrying capacity after the parting pressure is released—unless the fracture is propped. Typical propping agents for retaining the integrity of the fractures are nutshells, plastic beads, aluminum spacers, glass beads, sand and urea prills.

Proppants thus provide a means for meeting the objective of the fracturing which is to increase the well production by preventing collapse of the formation and resultant decrease in fluid permeability.

It is common to fracture oil wells using a water-based brine fluid containing a water-soluble polymer such as hydroxypropyl guar cross-linked with a transition metal salt as is wellknown in the art.

Traditionally, the introduction of reagents downhole during fracturing and other well stimulation processes is carried out by forcing a solution of the reagent down the hole and into the formation, whereupon it becomes absorbed onto the formation and released slowly from it. Unfortunately, the rate of release is variable and generally is quite fast.

It is known to force plastic beads of ethylene-vinyl acetate copolymers into the formation, but these beads are generally too large to get into the fractures formed in the formation since smaller beads would dissolve too rapidly. Further, the beads are too soft for the proppant function.

When fracturing is complete and the well is put into production, the flowing connate water may contain unstable salts which can precipitate and form scales on the production tubing. It is possible to inhibit the formation of scale by introducing a phosphonate scale inhibitor continuously downhole at a level of a few parts per million. It would be preferred to place the scale inhibitor downhole in a solid form during the fracturing operation and allowing it to leach back with the produced water; however, the scale inhibitor is too quickly solubilized to have a lasting effect in the downhole application.

It is known from British Patent Specification No. 1,290,554 to inhibit scale formation downhole by supplying downhole a solid linear carboxylic polymer having low molecular weight and in which the carboxylic groups are neutralized by an alkaline earth or other insolubilizing cation to an extent such that the polymer has a controlled low solubility in water. It is stated in that specification that water-soluble scale inhibitors may also be supplied downhole with the substantially water insoluble polymer beads.

Beads containing an oil-soluble reagent having wax crystal modifier activity dispersed in a polymeric matrix have been sold in the United States of America and used therein for oil production from an underground geological formation to inhibit the deposition of wax from the oil onto the walls of structures through which the produced oil was passed.

It is an object of this invention to provide an article and its use to enhance the production of hydrocarbons from geological reservoirs, more particularly from fractured formations.

It has been an additional object to devise a composition for providing controlled release of a reagent downhole, in a pipeline, in other fluids containing condensed water.

SUMMARY OF INVENTION

It is possible to provide for the introduction of an additive reagent into a fluid containing condensed water by providing solid polymeric bodies, each comprising a polymeric matrix containing a water soluble reagent such as a foamer, scale inhibitor, corrosion inhibitor, biocide, surfactant, oxygen scavenger and mixtures thereof. These bodies are, in use, positioned at a location where it is desired to release the reagent into the fluid containing condensed water and, upon contact with fluid in this location, release the active reagent into the fluid.

Thus in accordance with this invention there is a disclosure of a solid polymeric body comprising a solid polymer matrix containing a water-soluble reagent leachable into a fluid containing condensed water, said matrix being reagent permeative and the said body preferably having a softening point substantially above that of the temperature of the fluid in which it is to be employed and optimally having a leach rate in which fifty percent of the reagent is leached from the body in a time period up to 3 years by the fluid.

An object of this invention can be met in specific form by beads comprising a solid copolymeric matrix of acrylamide and methylenebis-acrylamide containing diethylene triamine pentakis methylene phosphonic acid or a salt thereof and having a diameter ranging from 0.2 to 1 mm. Such beads upon introduction downhole in a stimulation operation are expected to inhibit scale deposition.

There is also provided a disclosure of a method for recovering a fluid containing condensed water from an underground geological formation comprising the steps of:

(a) depositing solid polymeric particulate bodies having a reagent permeative solid polymeric matrix containing a water-soluble reagent downhole in the fluid containing condensed water producing region of the formation in an amount sufficient to alter the reactive properties of said fluids;

(b) flowing said fluids to the earth'surface through said bodies in a contiguous manner thereby leaching said reagent into said fluids; and (c) recovering said fluids modified by the presence of an active amount of said reagent.

DETAILED DESCRIPTION OF THE INVENTION

Each of the solid polymeric bodies may consist solely of a solid polymeric matrix containing the reagent or may contain a region, generally an outer region, of polymeric material having a lower rate of reagent permeation than that of the interior region and substantially free of reagent. The polymer of such an outer region or shell may be of the same material as the interior region matrix or may be different, and will be selected having regard to the release properties required from the polymeric bodies. The matrix containing the reagent may be of uniform composition throughout its body or its composition may vary, for instance having a different polymer composition in its outermost portions from its core portion. By appropriate selection of the polymeric materials for forming the bodies and the distribution of reagent within the bodies, it is possible to control the rate and duration of release of reagent into the fluid containing condensed water while retaining the physical (structural) integrity of the polymeric matrix.

It is this polymeric property of reagent permeativity which makes possible the transfer of the water-soluble reagent from the body which is insoluble in the fluid into the fluid containing condensed water that is in contact with the surface of the body. During and after the leaching of the reagent from the reagent permeative matrix of the body, the insoluble polymeric matrix retains its struc-tural integrity, which is in marked contrast to the approach taught in Egypt. J. Pharm. Sci., 19 No. 1–4, pages 143–62, 1980 in an article by A. Kassem et al. entitled "Formulation and Evaluation of Controlled Dissolution Phenobarbitone Marcomolecular Products Employing In Situ Suspension Polymerization With Methylmethacrylate" wherein the reagent coated beads were compressed into a body which upon reagent dissolution in the physiological aqueous fluids broke down the body into its component beads, thus fully destroying the structural integrity of the compressed body.

The polymeric bodies are preferably particles. The particle size is generally at least 10 microns and preferably at least 50, and usually at least 100 microns, since small particles can be difficult to handle and to position permanently in their desired environment. The particle size is generally less than 2 mm and preferable less than 1 mm, since large particles also may be difficult to position in their desired environment. Best results are generally obtained with a particle size of from 50 microns to 1 mm. The particles may have irregular shape and sizes, for instance, as a result of having been made by crushing, but preferably the particles are of substantially spherical or other uniform shape.

When being used in fracturing, the particles, preferably, have a size and hardness and/or resistance to flow such that they can be used in sand packing and will not be significantly degraded by the sand. The particle size distribution will be selected so that a pack of controlled permeability to fluid flow is formed and such that the particles have a controlled leach rate as set forth earlier.

The reagent is water-soluble, and as such is mixed in a hydrophilic polymerizable monomer such as acrylamide and its mixtures. The mixture is dispersed in a hydrophobic solvent and thereafter polymerized in an invert suspension polymerization process. The polymerizate is to be recovered as beads as taught herein, wherein the reagent is dispersed in the polymeric matrix. The softening point of the reagent should be above ambient temperatures encountered in use.

The reagent may be any active reagent that is soluble in water. The reagents are usefully selected from scale inhibitors, surfactants, corrosion inhibitors, biocides, foamers, oxygen scavengers and mixtures thereof.

(a) Scale Inhibitors

These reagents, usefully introduced in at least a scale inhibiting amount to the fluid containing condensed water are represented by phosphonates, phosphate esters, inorganic phosphates, poly (acrylic acid) and its salts as well as mixtures of these reagents.

1. Phosphonates include: amino tris-(methylenephosphonic acid) and salts thereof such as the trisodium; ethylenediamine tetrakis(methylenephosphonic acid) and salts thereof such as tetrapotassium; diethylenetriamine pentakis(methylenephosphonic acid) and salts thereof such as pentaammonium; hexamethylenediamine tetrakis(methylene phosphonic acid) and salts thereof; hydroxyethyl bis(phosphonic acid) and salts thereof such as disodium; etc. Useful phosphonic acids may be derived from any other primary or secondary amine, any nitrogen of which need not fully substituted with methylene phosphonate moieties.

2. Phosphate esters

Useful esters include those such as triethanolamine triphosphateor any hydroxyl group containing material which can be converted to a phosphate ester. These may be present as either free phosphoric acids or salts such as sodium, potassium or ammonium. The above and similar alcohols used herein to provide the ester may be oxyalkylated prior to formation of the phosphate ester in order to obtain the desired hydrophobic-hydrophilic balance.

3. Inorganic phosphates

Useful phosphates include those such as orthophosphoric acid, tripolyphosphoric acid and salts thereof, for example sodium, potassium or ammonium salts. 4. Poly(acrylic acids)

Particularly useful is a poly(acrylic acid) having a weight average molecular weight ($\overline{M}_w$) of from 1,000 to 5,000 and salts thereof such as the sodium and ammonium salts.

(b) Surfactants

These reagents which can be introduced into a fractured subterranean oil bearing formation in accordance with this invention are usefully introduced to inhibit emulsification of the crude oil with formation water, water flood injection water and/or water introduced by such processes as steam stimulation.

1. Demulsifiers

These water-soluble reagents include polyoxyalkylene ether and polyalkylene surfactants formed from the alkoxylation of alkyl phenols, phenolic resins, alcohols, glycols, amines, organic acids, carbohydrates, mercaptans, and partial esters of polybasic acids as represented by an oxyalkylated phenol formaldehyde resin, ethylene glycol and glycerol.

2. Other surfactants include:

a dispersant such as an ethoxylated alcohol or a mixture of ethoxylated alcohols;

a wetting agent such as an alcohol ether sulfate alone or in combination with ethyoxlated alcohols;

a water-soluble polymer such as poly N,N-dimethylaminoethylmethacrylate methyl chloride quaternary;

an emulsifier such as an ethoxylated polyol or amine;

a detergent such as an ethoxylated polyol in combination with phosphates sulfates, etc; and, a lubricant such as an alcohol ether phosphate and salts thereof.

(c) Corrosion Inhibitors

Useful reagents are those which have the property of corrosion inhibition.

Typical examples of water-soluble corrosion inhibitors are amines, diamines, fatty amines, polyamines, alkoxylated amines, hydrogenated fatty amines, amides, fatty acid amides, imidazolines, alkoxylated imidazolines and salts thereof quaternary amines and quaternized imidazolines.

(d) Biocides

These have biocidal activity of the level exhibited by such reagents as 2,2-dibromo-3-nitrilopropionamide, 2-methyl-4-isothiazolin-3-one, 5-chloro-2-methyl-4-isothiazolin-3-one, dithiocarbamate, aldehydes for example formaldehyde and glutaraldehyde, chlorinated phenols, methylenebisthiocyanates and guanidines.

(e) Foamers

Foamers as used herein include alcohol ether sulfates, sulfonates, ethoxylated polyols, ethoxylated amines, quaternized amines, amine oxides, ampholytics and mixtures of the foamers.

(g) Oxygen Scavengers

As used herein, oxygen scavengers remove trace amounts of oxygen which may enter the fluid and thereby increase its corrosivity. Representative reagents are sodium bisulfite and hydrazine.

Polymeric Body

The polymeric matrix is reagent permeative and preferably has a softening point as measured by a temperature-graded hot-bar of above 30° C. and most preferably is above 60° C., often up to 120° C. The combination of the reagent and the polymeric matrix must be such that the reagent is releasable into surrounding fluid at the desired time and rate either as a result of the fluid permeating through the matrix to dissolve the reagent or as a result of the reagent permeating through the matrix to dissolve into the fluid, or both.

The polymer of the matrix is preferably formed mainly of acrylic acid, acrylamide, or acrylonitrile or a mixture thereof and minor amounts of at least one difunctional hydrophilic comonomer such as methylene-bis-acrylamide. Small amounts of other hydrophilic polymerizable monomers, for instance up to 40% by weight, generally below 20% by weight and preferably below 10% by weight, may be included provided they do not deleteriously affect the properties of the polymer.

It is particularly preferred to include a small amount of hydrophobic monomer(s) such as N,n-dibutyl acrylamide which are useful in modification of the rate of reagent permeation from the polymeric body when these monomers are incorporated into the monomer mixture. The hydrophobic monomer tends to migrate toward the outer layers of the polymerizing body due to their hydrophobic nature relative to the reagents. The result is a body having a lower rate of reagent permeation through its outer region than that of the interior region. This approach provides a means of controlling the leach rate of the reagent from the body.

The amount of reagent is generally at least 5% by weight of the total body in order to maximize the amount of reagent introduced into the desired location. It can be difficult to produce bodies containing very high amounts of reagent and so the amount is generally not more than 50%, and usually not more than 30%, by weight of the total body. The preferred reagent amount is usually 10 to 30% by weight of the total body.

The invention has widely diverse applications since it makes possible a controlled release of reagent into fluids containing condensed water (such as crude oil, wet natural gas, and formation water which includes both connate and injected) in a uniform manner and over extended time periods. It makes possible the release of certain reagents from previously non- or difficultly accessible and diverse points such as in an oil bearing mineral formation one or more miles underground.

This invention provides a method for the controlled introduction of a reagent into an environment containing condensed water which method comprises the steps of: placing solid polymeric bodies, each body comprising a solid polymeric matrix insoluble in the environment and containing a water-soluble reagent in said environment; and leaching out said reagent from said bodies at a controlled and predetermined rate into the water of said environment.

In a preferred manner the invention provides a method preventing scale formation in a fluid containing condensed water and located in an underground geological formation which comprises: determining a positive scaling tendency of the formation fluid; and, thereafter depositing solid polymeric particulate bodies having a reagent permeative solid polymeric matrix containing a water-soluble reagent downhole in the fluid producing region of the formation in an amount sufficient to alter the reactive properties of said fluids; flowing said fluid to the earth's surface through said bodies in a contiguous manner thereby leaching said reagent into said fluid; and, recovering said fluid modified by the presence of an active amount of said reagent. This preferred method is at times usefully modified by the additional steps of interrupting the flow of said fluid from the formation to the earth's surface, depositing said bodies by means of a viscosified stimulation fluid containing at least one component reactive with said reagent and thereafter resuming the flow of said fluid to the earth's surface.

The method of making the bodies of a fluid containing condensed water-insoluble polymeric matrix containing substantially water-soluble reagent involves forming a dispersion of a reagent and liquid polymerizable material and polymerizing the polymerizable material while maintaining the particles dispersed in the medium. The polymerization results in the formation of a suspension of polymer beads each containing reagent. The beads may be filtered or otherwise separated from the hydrophobic medium. They may be washed and dried, but for introduction by means of an aqueous fluid or into an aqueous fluid the beads are best left in a damp and water-wetted state.

In order to obtain uniform and fine distribution of the reagent in the polymeric matrix, it is necessary for the reagent to be monomer-soluble rather than hydrophobic medium soluble and preferably the reagent is in liquid form during polymerization of the matrix. It could be introduced as a solution in water.

The following are examples of the invention.

EXAMPLE 1

Twenty grams of diethylene triamine pentakismethylene phosphonate sodium salt are dissolved in 156 grams of a 50% aqueous solution of acrylamide containing 2 grams of methylene-bis-acrylamide.

The resultant solution is then dispersed in 400 grams of Isopar ® M (an isoparaffinic solvent) contained in a one liter enclosed vessel provided with a variable speed stirrer for controlled agitation and a reflux condenser.

The speed of agitation is adjusted to give a stable dispersion and to this mixture is added 1 gram of azo-di-iso-butyronitrile. Suspension polymerization is allowed to continue for two hours after which time the product within the vessel consists of a suspension of aqueous polymeric gel beads in the Isopar ® M.

The temperature of the vessel is slowly raised to the boiling point of the Isopar ® M and a water/Isopar ® M azeotrope is distilled over, condensed, split and the Isopar ® M returned to the vessel.

Refluxing is continued until no further water azeotropes over which corresponds to the collection of 60 gram of water. The product within the vessel now consists of a suspension of small polymeric beads which are filtered, washed, and dried to give free flowing beads containing approximately 20% of the scale inhibitor.

EXAMPLE 2

If the above process is repeated using 20 grams of scale inhibitor reagent (as described), 136 grams of the 50% solution of acrylamide, 2 grams of methylene bis-acrylamide and 5 grams of N,N-dibutyl acrylamide, the beads are expected to have a shell containing a high proportion of N,N-dibutyl acrylamide and have slower release properties compared to the release properties of the beads of Example 1.

EXAMPLE 3

In order to produce a polymeric body according to this invention containing a leachable corrosion inhibitor reagent, the procedure of Example 1 is to be followed except that the active phosphonate reagent is replaced with the same weight of the imadazoline quaternary salt of the equimolar reaction product of tall oil fatty acid and diethylene triamine.

EXAMPLE 4

In order to produce a polymeric body according to this invention containing a leachable demulsifier, the procedure of Example 1 is followed except that the phosphonate is replaced with the same weight of a water-soluble oxyalkylated phenol formaldehyde resin of 2000 $\overline{M}w$.

EXAMPLES OF USE

The solid particles of the present invention can be used to inhibit scale deposition by placing them downhole with the proppant sand during the course of a fracturing operation. The outer shells of this bead initially protect scale inhibitor from chelating the metal cross-linker and thereby allowing the gelling of the fracturing fluid.

To effect the placement of the particles of the invention flow of fluids is shut in and a fracturing operation is carried out as follows. A fracturing fluid is prepared by gelling a 2% solution of potassium chloride with hydroxy propyl guar cross-linked with a transition metal complex. As the fluid is pumped downhole, 8 lbs/1000 gallons of 20–40 mesh sand mixed with 5% of the beads of the invention is added to serve as a proppant in the fractures formed in the producing formation. Pump pressure is increased above the frac7ure gradient of the rock formation and the fluid carries the proppant mixture into the fractures. The well is then shut in for 24 hours to allow the guar gel to degrade to a low viscosity solution. The released scale inhibitor from the bead not only prevents scale formation from the produced fluids, but also chelates the remaining metal cross-linkers for better cleanup of the fracturing gel. The well is allowed to flow back and the fracturing fluid is recovered leaving the proppant mixture of sand and polymer beads behind.

As the produced fluids flow through the proppant pack past the beads, the scale inhibitor slowly leaches out and scale deposition is inhibited in the well bore and the flow lines and production is maintained at a high level without scale blockage.

The particles of Example 1 can be used to prevent scale deposition from produced fluids by placing them downhole with the proppant sand during the course of a fracturing operation.

Connate water in a geological formation may have a tendency to deposit scale comprising calcium carbonate, calcium sulphate, strontium sulphate or barium sulphate or mixtures of at least two of the above compounds. This scale may be formed during production of the fluid due to temperature changes, pressure changes, turbulence, or pH changes due to loss of dissolved gases. Scales may also be formed when incompatible waters are mixed, for example, when sea water is injected into the formation for the purpose of reservoir pressure maintenance and comingles with the connate water. Water incompatibility may also occur when the connate water mixes with the fluids used in the stimulation operation. The likelihood of waters to form scale in an environment can be determined by analysis of the components in the water and is expressed as a scaling tendency. When this scaling tendency is greater than unity, indicating that scale formation is likely, this scale formation can be inhibited by using these beads during a fracturing operation.

The particles of Example 1 can be used to prevent scale deposition from produced fluids by placing them downhole with the other solids used in gravel packing a well to prevent the production of loose unconsolidated sand.

To effect the placement of the particles of Example 1, a gravel packing operation is performed with a carrier fluid and the proper mechanical equipment to place the packing solids at the specific producing zone. A screen or slotted liner is placed in front of the packing to hold it and, thereby, the formation in place. The carrier fluid may be salt water, crude oil, diesel or acid fluids. These fluids must be filtered to less than 2 microns. The viscosity and density of the fluid depends on the specific well being treated.

An example might be to use a carrier fluid that is 2% potassium chloride gelled with hydroxyethyl cellulose. The beads of Example 1 are mixed with packing gravel and sand to make a slurry containing about 20% by weight of the bead. The slurry is then placed at the producing zone by using one of the accepted techniques.

As the produced fluid flows through the gravel pack containing about 10% of the beads, the scale inhibitor slowly leaches out and deposition is inhibited in the well bore, flowline and other associated equipment.

The particles of Example 3 can be used to prevent corrosion of the metal equipment by the produced fluids by placing the beads downhole in a replaceable cartridge packed with the beads.

The cartridge could be designed to snap lock in the downhole tubing so it can be periodically replaced when all the corrosion inhibitor is leached out of the beads by the produced fluids passing through the cartridge. The length of service can be controlled by the leach out rate of the bead and by the size of the bead packed cartridge.

As the produced fluid flows through the cartridge containing the beads, the corrosion inhibitor slowly leaches out and inhibits corrosion of well tubing or casing, flowline and associated equipment.

The beads of Example 4 can be used to inhibit emulsification of the crude oil formation water, water flood injection water and/or water introduced by stimulation/workover processes by placing them downhole with the proppant sand during the course of a fracturing operation.

To effect the placement of the beads, a fracturing operation is carried out as previously described.

As the produced fluid flows through the proppant pack past the beads, demulsifier would slowly leach out to inhibit emulsion formation during production operations.

As used herein % by weight is based on the total weight of the body, polymer composition, water or bead, respectively.

What is claimed is:

1. A method for the controlled introduction of a water-soluble reagent into an environment containing condensed water which comprises:
    (a) suspension copolymerizing a monomer selected from acrylic acid, acrylamide, and acrylonitrile with a difunctional hydrophylic comonomer to form water-insoluble hard solid particles of a polymer having a softening point above said environment, said particles having structural integrity, internal porosity, and a particle size of at least 50 microns and less than 2 millimeters, said monomer with said comonomer having dissolved therein a water soluble reagent which is insoluble in said polymer whereby said reagent remains in the pores of said particles following the copolymerization step, said reagent constituting at least 5 weight percent and not more than 30 weight percent based on the combined weights of the polymer and the reagent; said reagent being selected from the group consisting of scale inhibitors, surfactants, corrosion inhibitors, biocides, foamers, and oxygen scavengers;
    (b) placing said particles in said environment;
    (c) flowing water through said particles thereby leaching an effective amount of said water-soluble reagent from said particles forming an aqueous solution of said reagent in said environment, said particles retaining their physical structural integrity; and
    (d) flowing said aqueous solution in said environment.

2. The method of claim 1 wherein the scale inhibitors are selected from phosphonates, phosphate esters, inorganic phosphates, polyacrylic acid; the surfactants are selected from polyoxyalkylene ether and polyalkylene surfactants; the corrosion inhibitors are selected from amines; the biocides are selected from 2,2-dibromo-3-nitrilopropionamide, 2-methyl-4-iso-thiazolin-3-one, 5-chloro-2-methyl-4-iso-thiazolin-3-one, dithiocarbamate, and aldehydes; the foamers are selected from alcohol ether sulfates, sulfonates, ethoxylated polyols, ethoxylated amines, quaternized amines, amine oxides, and ampholytics; and the oxygen scavengers are selected from sodium bisulfite and hydrazine.

3. The method as defined in claim 1 wherein said water-soluble reagent is removed from said pores of said particles to outside of said body at a leach rate in which fifty percent of the reagent is leached from the particles in up to 3 years by said environment.

4. The method as defined in claim 1 wherein said monomer is acrylamide and said comonomer is a methylene-bisacrylamide and said water-soluble reagent is diethylenetriaminepentakismethylene phosphonic acid or salts thereof.

5. The method as defined in claim 1 wherein the polymer has a softening point temperature ranging upwards from 30° C.

6. A method according to claim 1 wherein said environment is subterranean.

7. A method according to claim 6 wherein said environment is a substantially hydrocarbon bearing formation.

8. A method according to claim 6 wherein said environment is a substantially water containing formation.

9. A method according to claim 1 wherein the placing of said particles is by means of a stimulation fluid.

10. A method according to claim 9 wherein said fluid is aqueous and said particles are introduced into said fluid in a damp and water-wetted state.

11. A method according to claim 9 wherein said reagent is reactive with at least one component of said stimulation fluid whereby the reaction between said reagent and said component is prevented by said reagents inclusion in said particles.

12. A method according to claim 1 wherein the placing of said bodies is by means of a workover fluid.

13. A method according to claim 1 wherein said reagent is diethylenetriamine pentakismethylene phosphonic acid or its salt.

* * * * *